(12) United States Patent
Wendland

(10) Patent No.: US 10,391,471 B2
(45) Date of Patent: Aug. 27, 2019

(54) POLYMERIC MATERIALS FOR CAPTURING FORMALDEHYDE

(71) Applicant: 3M INNOVATIVE PROPERTIES COMPANY, St. Paul, MN (US)

(72) Inventor: Michael S. Wendland, North Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 325 days.

(21) Appl. No.: 15/520,163

(22) PCT Filed: Nov. 10, 2015

(86) PCT No.: PCT/US2015/059909
§ 371 (c)(1),
(2) Date: Apr. 19, 2017

(87) PCT Pub. No.: WO2016/081226
PCT Pub. Date: May 26, 2016

(65) Prior Publication Data
US 2017/0333870 A1  Nov. 23, 2017

Related U.S. Application Data

(60) Provisional application No. 62/080,817, filed on Nov. 17, 2014.

(51) Int. Cl.
| | |
|---|---|
| B01J 20/26 | (2006.01) |
| C08F 12/32 | (2006.01) |
| C08F 12/34 | (2006.01) |
| C08F 8/36 | (2006.01) |
| C08F 8/32 | (2006.01) |
| B01D 53/02 | (2006.01) |
| B01D 53/72 | (2006.01) |
| B01D 53/82 | (2006.01) |
| B01J 20/28 | (2006.01) |
| B01J 20/30 | (2006.01) |

(52) U.S. Cl.
CPC ............ *B01J 20/265* (2013.01); *B01D 53/02* (2013.01); *B01D 53/72* (2013.01); *B01D 53/82* (2013.01); *B01J 20/261* (2013.01); *B01J 20/264* (2013.01); *B01J 20/28057* (2013.01); *B01J 20/28061* (2013.01); *B01J 20/3085* (2013.01); *C08F 8/32* (2013.01); *C08F 8/36* (2013.01); *C08F 12/32* (2013.01); *C08F 12/34* (2013.01); *B01D 2253/202* (2013.01); *B01D 2253/306* (2013.01); *B01D 2257/702* (2013.01); *B01D 2257/708* (2013.01); *B01D 2258/06* (2013.01); *C08F 2800/10* (2013.01)

(58) Field of Classification Search
None
See application file for complete search history.

(56) References Cited

U.S. PATENT DOCUMENTS

| 9,463,454 B2 | 10/2016 | Wendland |
| 2016/0089667 A1 | 3/2016 | Wendland |
| 2017/0182475 A1 | 6/2017 | Wendland |

FOREIGN PATENT DOCUMENTS

| CN | 1062541 | 7/1992 |
| CN | 1548164 | 11/2004 |
| CN | 1569313 | 1/2005 |
| CN | 103173004 | 6/2013 |
| GB | 800639 | 8/1958 |
| TW | 201425345 | 7/2014 |
| WO | WO 2014/051918 | 4/2014 |
| WO | WO 2014/052021 | 4/2014 |

OTHER PUBLICATIONS

Carta, "Novel Spirobisindanes for Use as Precursors to Polymers of Intrinsic Microporosity", Organic Letters, 2008, vol. 10, No. 13, pp. 2641-2643.
International Search Report for PCT International Application No. PCT/US2015/059909, dated Feb. 10, 2016, 4pgs.
Search Report for Taiwan Patent Application No. 104137758, date of completion of the search, Nov. 15, 2018, 2 pages.

*Primary Examiner* — Anita Nassiri-Motlagh
(74) *Attorney, Agent, or Firm* — Jean A. Lown

(57) ABSTRACT

Sorbent polymeric material suitable for capturing formaldehyde, polymeric material resulting from the capture of formaldehyde by the sorbent polymeric material, and methods for capturing formaldehyde are provided. The sorbent polymeric material has multiple aromatic rings and can be formed by initially preparing a precursor polymeric material from a polymerizable composition that contains a free-radically polymerizable spirobisindane monomer. The precursor polymeric material is subsequently treated with a sulfonyl-containing compound to form groups of formula —$SO_2R^5$ where each $R^5$ is independently —$NH_2$ or —$NR^6$-Q-$NR^6R^7$. Each $R^6$ is hydrogen or an alkyl. Each $R^7$ is hydrogen or —C(=NH)—$NH_2$. Each Q is a single bond, alkylene, or a group of formula -($Q^1$-$NR^6$)$_x$-$Q^2$- where each $Q^1$ is an alkylene, each $Q^2$ is an alkylene, and x is in an integer in a range of 1 to 4.

20 Claims, No Drawings

POLYMERIC MATERIALS FOR CAPTURING FORMALDEHYDE

CROSS REFERENCE TO RELATED APPLICATIONS

This application is a national stage filing under 35 U.S.C. 371 of PCT/US2015/059909, filed Nov. 10, 2015, which claims the benefit of U.S. Provisional Application No. 62/080,817, filed Nov. 17, 2014, the disclosure of which is incorporated by reference in its/their entirety herein.

TECHNICAL FIELD

Sorbent polymeric materials suitable for capturing formaldehyde, polymeric materials resulting from capture of formaldehyde by the sorbent polymeric material, and methods for capturing formaldehyde are described.

BACKGROUND

Formaldehyde is a known carcinogen and allergenic. For this reason, the Occupational Safety and Health Administration (OSHA) in the United States has set an eight hour exposure limit of 0.75 parts per million and a 15 minute exposure limit of 2 parts per million for formaldehyde vapor. In spite of its toxicity, formaldehyde is a high volume industrial compound. It is used, for example, to prepare a number of polymeric materials that find wide spread use in various building materials including foam insulation, particle board, carpets, paints, and varnishes. Out-gassing of residual formaldehyde from these building materials makes formaldehyde one of the most prevalent indoor air pollutants. Formaldehyde is also a by-product of the combustion of organic materials. As a result, formaldehyde is a common outdoor pollutant as well arising from automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

The high volatility of formaldehyde (it is a gas at room temperature) makes it extremely difficult to capture by the mechanism of physisorption alone. Because formaldehyde is reactive, however, it can be more readily captured through chemisorption. With chemisorption, the formaldehyde vapors are captured by chemically reacting with the sorbent itself or with chemicals impregnated in the sorbent. Thus, the key to making high capacity sorbents for formaldehyde is to provide a sorbent with many reactive sites for formaldehyde.

One typical sorbent material that has been used for capturing formaldehyde is based on activated carbon scaffolds. The scaffold of activated carbon, however, is relatively inactive and this inactivity makes it difficult to incorporate a high density of reactive groups into the activated carbon scaffold itself. For this reason, most of the efforts in making sorbents for formaldehyde have been focused on finding impregnation chemistries that can react with formaldehyde. Thus, the activated carbon scaffolds are typically impregnated with various chemistries to react with formaldehyde. The two most common impregnation chemistries used for formaldehyde capture are the sodium salt of sulfamic acid and ethylene urea co-impregnated with phosphoric acid.

Impregnation in general has some draw backs for making sorbents. First, impregnation chemistries can migrate and this is problematic especially if other sorbents are used in the same product. Another disadvantage to impregnation is that it removes activated carbon capacity for adsorbing volatile organic compounds (VOCs). The impregnation chemistry occupies the pores of the activated carbon thus reducing the surface area available to capture non-reactive vapors that are captured by phyisorption only.

SUMMARY

Sorbent polymeric materials suitable for capturing formaldehyde, polymeric materials resulting from capture of formaldehyde by the sorbent polymeric material, and methods for capturing formaldehyde are provided.

More particularly, formaldehyde is captured by a polymeric material having groups that can react with formaldehyde. The reactive groups are of formula $-SO_2R^5$ where each $R^5$ is independently $-NH_2$ or $-NR^6-Q-NR^6R^7$. Each $R^6$ is hydrogen or an alkyl. Each $R^7$ is hydrogen or $-C(=NH)-NH_2$. Each Q is a single bond, alkylene, or a group of formula $-(Q^1-NR^6)_x-Q^2-$ where each $Q^1$ is an alkylene, each $Q^2$ is an alkylene, and x is in an integer in a range of 1 to 4.

Polymeric materials with groups of formula $-SO_2R^5$ are referred to herein interchangeably as a "sorbent" or as a "sorbent polymer" or as a "sorbent polymeric material". The sorbent polymeric materials are usually porous and, depending on the particular monomers and reaction conditions used to form the sorbent polymeric materials, the pores size can be in the microporous region, mesoporous region, macroporous region or any combination thereof.

The sorbent polymeric material has multiple aromatic rings and can be formed by initially preparing a precursor polymeric material from a polymerizable composition that contains a free-radically polymerizable spirobisindane monomer. The precursor polymeric material is subsequently treated with a sulfonyl-containing compound to form groups of formula $-SO_2R^5$.

In a first aspect, a method of capturing formaldehyde is provided. The method includes (a) providing a sorbent polymeric material having multiple aromatic rings and having at least one group of formula $-SO_2R^5$ and up to one group of formula $-SO_2R^5$ for each aromatic ring in the sorbent polymeric material and (b) sorbing formaldehyde on the sorbent polymeric material. Providing the sorbent polymeric material includes forming a precursor polymeric material and then reacting the precursor polymeric material with a sulfonyl-containing compound. The precursor polymeric material includes a polymerized product of a polymerizable composition containing a monomer of Formula (I).

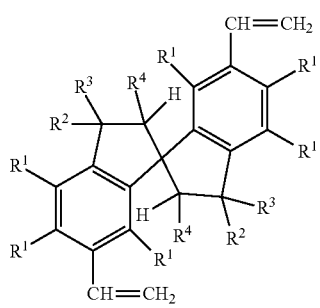

(I)

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. Each $R^5$ is independently $—NH_2$ or $—NR^6\text{-}Q\text{-}NR^6R^7$. Each $R^6$ is hydrogen or an alkyl. Each $R^7$ is hydrogen or $—C(=NH)—NH_2$. Each Q is a single bond, alkylene, or a group of formula $-(Q^1\text{-}NR^6)_x\text{-}Q^2\text{-}$ where each $Q^1$ is an alkylene, each $Q^2$ is an alkylene, and x is in an integer in a range of 1 to 4.

In a second aspect, a polymeric material is provided that includes a reaction product of a mixture containing (a) a sorbent polymeric material having multiple aromatic rings and having at least one group of formula $—SO_2R^5$ and up to one group of formula $—SO_2R^5$ for each aromatic ring in the sorbent polymeric material and (b) formaldehyde. The sorbent polymeric material is the same as described above.

DETAILED DESCRIPTION

Methods of capturing formaldehyde on a sorbent polymeric material are provided. The sorbent polymeric material has groups of formula $—SO_2R^5$ that can react with formaldehyde. The sorbent polymeric material can be formed by (a) preparing a precursor polymeric material from a polymerizable composition that contains a free-radically polymerizable spirobisindane monomer and (b) treating the precursor polymeric material with a sulfonyl-containing compound to form groups of formula $—SO_2R^5$. Each $R^5$ is independently $—NH_2$ or $—NR^6\text{-}Q\text{-}NR^6R^7$. Each $R^6$ is hydrogen or an alkyl. Each $R^7$ is hydrogen or $—C(=NH)—NH_2$. Each Q is a single bond, alkylene, or a group of formula $-(Q^1\text{-}NR^6)_x\text{-}Q^2\text{-}$ where each $Q^1$ is an alkylene, each $Q^2$ is an alkylene, and x is in an integer in a range of 1 to 4.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have up to 20 carbon atoms and can be linear, branched, cyclic, or a combination thereof. When the alkyl is linear, it can have 1 to 20 carbon atoms. When the alkyl is branched or cyclic, it can have 3 to 20 carbon atoms.

The term "alkylene" refers to a divalent group that is a radical of an alkane. The alkylene group can have up to 20 carbon atoms and can be linear, branched, cyclic, or a combination thereof. When the alkylene is linear, it can have 1 to 20 carbon atoms. When the alkylene is branched or cyclic, it can have 3 to 20 carbon atoms.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "sulfonyl" refers to the group $—SO_2—$. The term "sulfonyl-containing compound" refers to a compound having a $—SO_2—$ group. The sulfonyl-containing compound may or may not directly introduce the group $—SO_2R^5$ to the precursor polymer. In some embodiments, an intermediate sulfonyl-containing group is introduced by reaction of the precursor with the sulfonyl-containing compound. The intermediate is subsequently reacted to provide a sorbent polymeric material with groups of formula $—SO_2R^5$.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

The term "mircopores" refers to pores having a diameter less than 2 nanometers.

The term "mesopores" refers to pores having a diameter in a range of 2 to 50 nanometers.

The term "macropores" refers to pores having a diameter greater than 50 nanometers.

In a first aspect, a method of capturing formaldehyde is provided. The method is based on the use of a sorbent polymeric material having multiple aromatic rings and having groups of formula $—SO_2R^5$. Formaldehyde can chemically react with the $—SO_2R^5$ groups; this reaction results in the capture of formaldehyde by the sorbent polymeric material. The sorbent polymeric material is typically formed from a precursor polymeric material that does not have the groups of formula $—SO_2R^5$. The precursor polymeric material includes a polymerized product of a polymerizable composition containing a monomer of Formula (I).

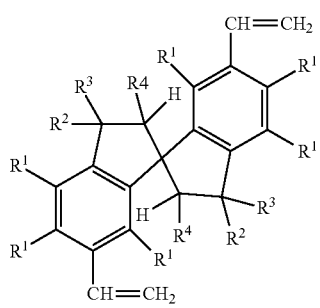

(I)

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Each $R^1$ in Formula (I) is hydrogen, halo, alkyl, aryl, alkaryl, or aralkyl. Suitable halo groups for $R^1$ include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

At least one $R^1$ is hydrogen in the monomer of Formula (I). In some embodiments, there is at least one $R^1$ equal to hydrogen on each aromatic ring shown in Formula (I). That is, there are at least two $R^1$ groups equal to hydrogen in the monomer of Formula (I). This is often the position that undergoes a reaction with the sulfonyl-containing compound to introduce a group of formula $-SO_2R^5$ into the precursor polymeric material during the formation of the sorbent polymeric material. That is, in the final sorbent polymeric material, one of the $R^1$ groups equal to hydrogen in the precursor polymeric material prepared from the monomer of Formula (I) is replaced with a sulfonyl-containing group of formula $-SO_2R^5$.

Each $R^2$ in Formula (I) is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to adjacent carbon atom to form a carbon-carbon bond. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^4$ is independently hydrogen or combines with $R^3$ connected to an adjacent carbon atom to form a carbon-carbon bond.

In some specific embodiments of the monomer of Formula (I), $R^1$ is hydrogen or halo, $R^2$ is an alkyl having 1 to 10 carbon atoms (e.g., 1 to 6 carbon atoms, 1 to 4 carbon atoms, 1 to 3 carbon atoms, or 1 carbon atom), $R^3$ is an alkyl having 1 to 10 carbon atoms (e.g., 1 to 6 carbon atoms, 1 to 4 carbon atoms, 1 to 3 carbon atoms, or 1 carbon atom), and $R^4$ is hydrogen. In other more specific embodiments of the monomer of Formula (I), each $R^1$ is hydrogen, $R^2$ is an alkyl having 1 to 6 carbon atoms (e.g., 1 to 4 carbon atoms, 1 to 3 carbon atoms, or 1 carbon atom), $R^3$ is an alkyl having 1 to 6 carbon atoms (e.g., 1 to 4 carbon atoms, 1 to 3 carbon atoms, or 1 carbon atom), and $R^4$ is hydrogen. In an even more specific embodiment of the monomer of Formula (I), each $R^1$ is hydrogen, $R^2$ is methyl, $R^3$ is methyl, and $R^4$ is hydrogen; this monomer is 3,3,3',3'-tetramethyl-1,1'-spirobisindan-6,6'-divinyl.

The monomers of Formula (I) can be prepared using any known method. For example, monomers can be prepared as shown in Reaction Scheme A where all of the $R^1$ and $R^4$ groups are hydrogen and where all of the $R^2$ and $R^3$ groups are alkyl or hydrogen.

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with tributyl(vinyl) tin in the presence of lithium chloride, a palladium catalyst, and a solvent such as N,N-dimethyl formamide (DMF) to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Monomers of Formula (I) can be prepared as shown in Reaction Scheme B where $R^3$ and $R^4$ combine to form a carbon-carbon double bond and where $R^2$ is an alkyl, aryl, alkaryl, or aralkyl.

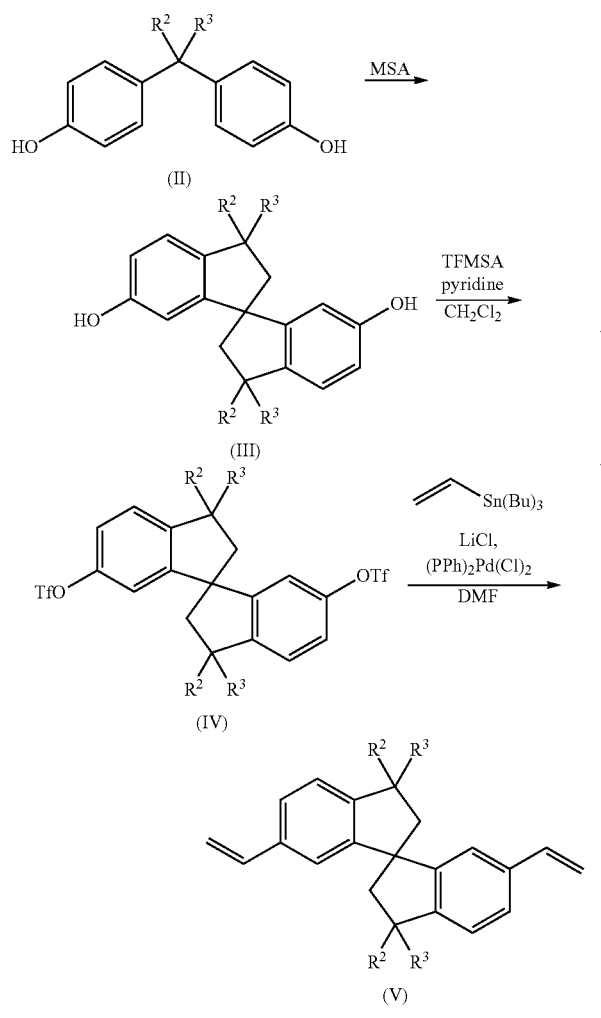

Reaction Scheme A

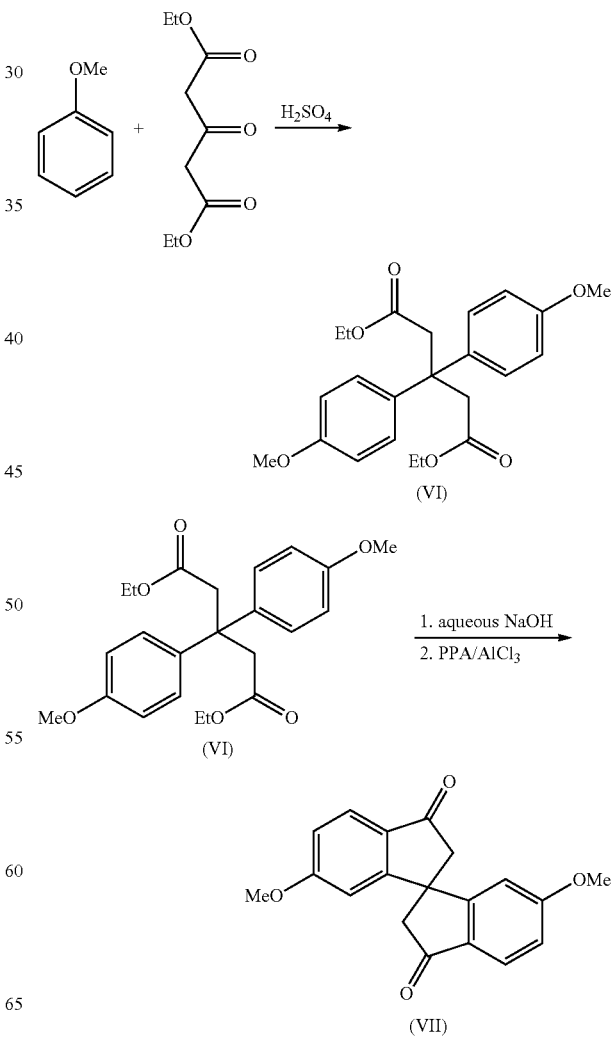

Reaction Scheme B

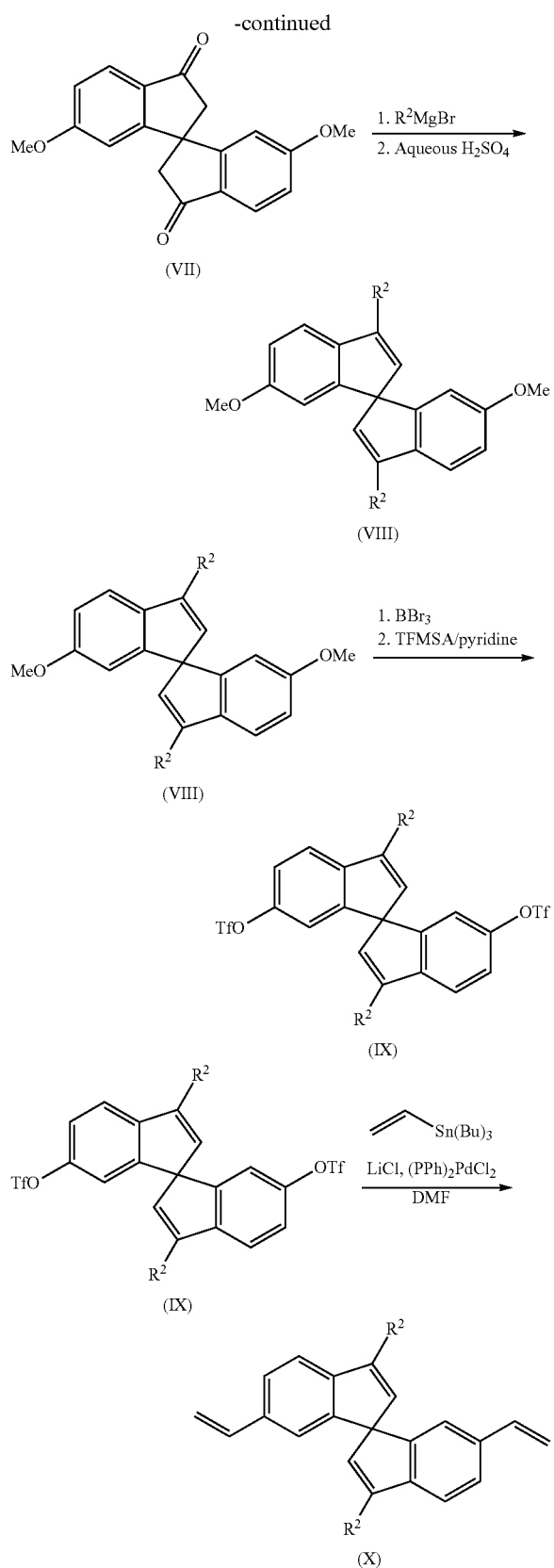

The chemistry involved in the formation of the dione (Compound (VII)) is described in *Org. Lett.*, 2008, 10, 2641. More specifically, diethyl-1,3-acetonedicarboxylate and methoxybenzene are reacted in the presence of sulfuric acid to form Compound (VI). This reaction is followed by hydrolysis and then Friedel-Crafts acylation mediated by polyphosphoric acid (PPA) and aluminum trichloride ($AlCl_3$) to form Compound (VII). Various monomers of Formula (I) can be prepared from the dione (Compound (VII)) using Grignard reactions. This type of reaction is exemplified in Reaction Scheme B using $R^2MgBr$ as the Grignard reagent. The dehydrated spirobisindane (Compound (VIII)) is formed after treatment with aqueous sulfuric acid. Compound (VIII) is reacted with boron tribromide ($BBr_3$) to convert the methoxy groups to hydroxyl groups. The hydroxyl groups are then reacted with trifluoromethane sulfonic anhydride (TFMSA) in the presence of pyridine and a solvent such as methylene chloride to produce Compound (IX) with triflate groups. The triflate groups are reacted with tributyl(vinyl) tin in the presence of lithium chloride, a palladium catalyst, and a solvent such as N,N-dimethyl formamide (DMF). This reaction, which is often referred to as a Stille coupling reaction, introduces the polymerizable groups as shown in Compound (X).

The polymerizable composition used to prepare the precursor polymeric material includes at least a monomer of Formula (I). In some embodiments, the only monomer in the polymerizable composition is of Formula (I) and the precursor polymeric material is a homopolymer. In other embodiments, the polymerizable composition includes a monomer of Formula (I) and at least one co-monomer that is not of Formula (I). Such a precursor polymeric material is a copolymer.

The co-monomers are often selected to prepare a precursor polymeric material that is porous. In some embodiments, the co-monomers include one or more polyvinyl aromatic monomers. The term "polyvinyl aromatic monomer" refers to a monomer that is not of Formula (I) and that has a plurality (e.g., two or three) of vinyl groups that are each bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. The polyvinyl aromatic monomer is often a divinyl aromatic monomer (e.g., divinylbenzene or divinylbenzene substituted with one or more alkyl groups) or a trivinyl aromatic monomer (e.g., trivinylbenzene or trivinylbenzene substituted with one or more alkyl groups).

The polymerizable compositions often contain at least 1 weight percent, at least 5 weight percent, at least 10 weight percent, at least 20 weight percent, at least 30 weight percent, at least 40 weight percent, or at least 50 weight percent of a monomer of Formula (I). For the preparation of polymeric material with micropores, the polymerizable composition often contains at least 40 weight percent, at least 50 weight percent, at least 60 weight percent, at least 70 weight percent, at least 80 weight percent, or at least 90 weight percent of the monomer of Formula (I).

In some embodiments, the polymerizable composition can include 1 to 99 weight percent of a monomer of Formula (I) and 1 to 99 weight percent of a polyvinyl aromatic monomer. For example, the polymerizable composition can contain 10 to 90 weight percent of a monomer of Formula (I) and 10 to 90 weight percent of a polyvinyl aromatic monomer, 20 to 80 weight percent of a monomer of Formula (I) and 20 to 80 weight percent of a polyvinyl aromatic monomer, 30 to 70 weight percent of a monomer of Formula (I) and 30 to 70 weight percent of a polyvinyl aromatic monomer, or 40 to 60 weight percent of a monomer of Formula (I) and 40 to 60 weight percent of a polyvinyl aromatic monomer. The weight percent is based on a total weight of monomers in the polymerizable composition.

In other embodiments, the polymerizable composition can include 50 to 99 weight percent of a monomer of Formula (I) and 1 to 50 weight percent of a polyvinyl aromatic monomer. For example, the polymerizable composition can contain 60 to 99 weight percent of a monomer of Formula (I) and 1 to 40 weight percent of a polyvinyl aromatic monomer, 70 to 99 weight percent of a monomer of Formula (I) and 1 to 30 weight percent of a polyvinyl aromatic monomer, 80 to 99 weight percent of a monomer of Formula (I) and 1 to 20 weight percent of a polyvinyl aromatic monomer, or 90 to 99 weight percent of a monomer of Formula (I) and 1 to 10 weight percent of a polyvinyl aromatic monomer. The weight percent is based on a total weight of monomers in the polymerizable composition.

Some polyvinyl aromatic monomers contain one or more mono-vinyl aromatic monomers as impurities. As used herein, the term "mono-vinyl aromatic monomer" refers to a monomer having a single vinyl group bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. Example mono-vinyl aromatic monomers include, but are not limited to, styrene, ethyl styrene, and the like.

In some embodiments, the polyvinyl aromatic monomer contains up to 25 weight percent, up 20 weight percent, up to 15 weight percent, up to 10 weight percent, or up to 5 weight percent mono-vinyl aromatic monomer. For example, technical grade divinylbenzene typically contains about 20 weight percent ethyl styrene. The weight percent is based on a total weight of the mono-vinyl aromatic monomer and the polyvinyl aromatic monomer.

Considering impurities that may be present in the polyvinyl aromatic monomers, the polymerizable compositions often contain 1 to 99 weight percent of a monomer of Formula (I), 0 to 25 weight percent of mono-vinyl aromatic monomer, and 1 to 99 weight percent of a polyvinyl aromatic monomer. In another example, the polymerizable composition contains 1 to 98 weight percent of a monomer of Formula (I), 1 to 20 weight percent of a mono-vinyl aromatic monomer, and 1 to 98 weight percent of a polyvinyl aromatic monomer. In yet another example, the polymerizable composition contains 5 to 90 weight percent of a monomer of Formula (I), 5 to 19 weight percent of a mono-vinyl aromatic monomer, and 5 to 90 weight percent of a polyvinyl aromatic monomer. If polymeric material that is porous is desired, the amount of mono-vinyl aromatic monomer is typically selected to be less than 15 weight percent, less than 10 weight percent, or less than 5 weight percent and often additionally contains at least 50 weight percent of a monomer of Formula (I). The weight percent is based on a total weight of monomer in the polymerizable composition.

In some embodiments, a precursor polymeric material that is microporous is desired. To prepare microporous precursor polymeric material, the polymerizable composition often contains 40 to 99 weight percent of a monomer of Formula (I), 0 to 15 weight percent of a mono-vinyl aromatic monomer, and 1 to 60 weight percent of a polyvinyl aromatic monomer. For example, the polymerizable composition contains 50 to 99 weight percent of a monomer of Formula (I), 0 to 10 weight percent of a mono-vinyl aromatic monomer, and 1 to 50 weight percent of a polyvinyl aromatic monomer. In another example, the polymerizable composition contains 60 to 99 weight percent of a monomer of Formula (I), 0 to 10 weight percent of a mono-vinyl aromatic monomer, and 1 to 40 weight percent of a polyvinyl aromatic monomer. In yet another example, the polymerizable composition contains 70 to 99 weight percent of a monomer of Formula (I), 0 to 10 weight percent of a mono-vinyl aromatic monomer, and 1 to 30 weight percent of a polyvinyl aromatic monomer. The weight percent is based on a total weight of monomer in the polymerizable composition.

In addition to the various monomers, the polymerizable compositions typically include an initiator for free radical polymerization reactions. Any suitable free radical initiator can be used. In some embodiments, the free radical initiator is a thermal initiator that is usually activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of initiator can affect the polymerization rate, which in turn can influence the formation of precursor polymeric material.

Suitable thermal initiators include, but are not limited to, organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide, and mixtures thereof. The temperature needed to activate the thermal imitator is often in a range of 25° C. to 160° C., 30° C. to 160° C., or 40° C. to 160° C.

Suitable redox initiators include arylsulfinate salts or triarylsulfonium salts in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition typically also includes a solvent. Any suitable solvent or mixture of solvents can be selected. The one or more solvents are typically selected to be miscible with the monomers included in the polymerizable composition. Stated differently, the monomers in the polymerizable composition are typically dissolved in one or more solvents. Additionally, the selection of the one or more solvents can alter the porosity of the precursor polymeric material formed from the polymerizable composition. The porosity can often be increased by delaying the onset of phase separation of the growing polymeric chains during the polymerization process. That is, the use of solvents with good solubility for both the monomers and the growing polymeric material tends to enhance porosity. Solubility parameter calculations can be used to select a solvent or solvent mixture that is close to that of the polymeric material. Solvents that tend to enhance porosity include, but are not limited to, ethyl acetate, amyl acetate (i.e., n-pentyl acetate), and methyl ethyl ketone.

The onset of phase separation of the growing polymeric chains also can be delayed by reducing the rate of polymerization. The rate can be reduced by using a lower polymerization temperature and selecting an initiator that is activated at a lower temperature. The amount of the initiator added to the polymerizable composition can also influence the rate of reaction. That is, the reaction rate is typically increased with the addition of higher amounts of the initiator.

Additionally, the percent solids of the polymerizable composition can influence the rate of polymerization. Typically, lower percent solids tend to favor porosity. The percent solids are often in a range of 0.5 to 50 weight percent, 1 to 40 weight percent, 1 to 30 weight percent, 1 to 20 weight percent, 1 to 15 weight percent, 1 to 10 weight percent, 1 to 6 weight percent, or 2 to 6 weight percent based on a total weight of the polymerizable composition.

Other types of polymerization methods can be used, if desired, such as, for example, emulsion polymerization methods and suspension polymerization methods. If porous precursor polymeric material is desired, the polymerizable compositions and reaction conditions can be selected using the principles discussed above.

The polymerized product, which is the precursor polymeric material, can be a monolith that can be easily broken apart for washing to remove any residual monomer. The washed product can be dried to form a powder. Alternatively, if suspension polymerization or emulsion polymerization methods are used, the polymerized product can be in the form of beads or particles.

The precursor polymeric material can be porous. The porosity can be characterized from adsorption isotherms obtained at various partial pressures (e.g., $10^{-6}$ to 0.98) using nitrogen or argon as the sorbate under cryogenic conditions. The total porosity can be calculated based on the total amount of nitrogen adsorbed at a relative pressure close to 0.95 or higher. The total porosity is often at least 0.10 $cm^3/gram$, at least 0.20 $cm^3/gram$, at least 0.30 $cm^3/gram$, or at least 0.4 $cm^3/gram$. The total porosity can be, for example, up to 1.2 $cm^3/gram$ or higher, up to 1.1 $cm^3/gram$, up to 1.0 $cm^3/gram$, up to 0.95 $cm^3/gram$, or up to 0.90 $cm^3/gram$.

The total porosity and the pore size distribution of the precursor polymeric material can be varied by choice of monomers in the polymerizable composition and the reaction conditions such as solvent selection, the percent solids of the polymerizable composition, and the polymerization rate. In many embodiments, the porous precursor polymeric material is microporous, mesoporous, or both. Homopolymers prepared from polymerizable compositions containing a monomer of Formula (I) tend to be microporous. Depending on the specific reaction conditions, the porosity can be predominately microporous. Various polyvinyl aromatic monomers that are not of Formula (I) can be added to the polymerizable composition to prepare precursor polymeric material having both micropores and mesopores. As the amount of the polyvinyl aromatic monomer is increased relative to the monomer of Formula (I), the percentage of the total porosity attributable to micropores tends to decrease.

The total surface area can be calculated from BET (Brunauer-Emmett, and Teller) analysis of the isotherm data at relative pressures less than 0.35, less than 0.30, less than 0.25, or less than 0.20. The total surface area is often at least 100 $m^2/gram$, at least 200 $m^2/gram$, at least 400 $m^2/gram$, or at least 600 $m^2/gram$. The total surface area of the precursor polymeric material can be, for example, up to 1000 $m^2/gram$ or higher, up to 900 $m^2/gram$, up to 850 $m^2/gram$, or up to 800 $m^2/gram$.

The precursor polymeric material is subsequently treated with a sulfonyl-containing compound. This reaction results in the addition of a sulfonyl-containing group of formula —$SO_2R^5$ to the precursor polymeric material and the formation of a sorbent polymeric material. The sulfonyl-containing group typically replaces a hydrogen atom that is bonded to a carbon atom that is part of an aromatic ring of the precursor polymeric material. For example, the sulfonyl-containing group often replaces a $R^1$ group that is equal to hydrogen in the precursor polymeric material. Alternatively or additionally, the sulfonyl-containing group can replace a hydrogen atom that is bonded to a carbon atom in any aryl group, in the aryl portion of any aralkyl group, or in the aryl portion of any alkaryl group in the precursor polymeric material. Further, the sulfonyl-containing group can be added to a double bond in the precursor polymeric material where groups $R^3$ and $R^4$ combine to form a carbon-carbon double bond. At least one aromatic ring in the sorbent polymeric material contains a sulfonyl-containing group. Typically, the sorbent polymeric material has a maximum number of sulfonyl-containing groups equal to the total number of aromatic rings. There is usually no more than one sulfonyl-containing group per aromatic ring in the sorbent polymeric material.

The sulfonyl-containing group is of formula —$SO_2R^5$, where the group $R^5$ is —$NH_2$, or —$NR^6$-Q-$NR^6R^7$. Any of these $R^5$ can be in the form of a salt depending on the pH conditions. Suitable anions for salts include, but are not limited to, halides, sulfates, phosphates, nitrates, and carboxylates (e.g., acetate).

In some embodiments, the sulfonyl-containing group is of formula —$SO_2NH_2$ or a salt of the conjugate acid (the cation is —$SO_2NH_3+$). In still other embodiments, the sulfonyl-containing group is of formula —$SO_2NR^6$-Q-$NR^6R^7$ or the salt of the conjugate acid. Each $R^6$ group is hydrogen or alkyl and each $R^7$ group is hydrogen or —$C(=NH)NH_2$. Suitable $R^6$ alkyl groups often have 1 to 10 carbon atoms, 1 to 6 carbon atoms, 1 to 4 carbon atoms, or 1 to 3 carbon atoms. In many examples, $R^6$ alkyl groups are methyl or ethyl. The group Q is a single bond, alkylene, or a group of formula -($Q^1$-$NR^6$)$_x$-$Q^2$- where each $Q^1$ and $Q^2$ is independently an alkylene and where x is an integer in a range of 1 to 4. Suitable alkylene groups for Q, $Q^1$, and $Q^2$ often have 1 to 10 carbon atoms, 1 to 6 carbon atoms, 1 to 4 carbon atoms, or 1 to 3 carbon atoms. If Q is a single bond and both $R^6$ and $R^7$ are hydrogen, the sulfonyl group has a hydrazinyl group (i.e., —NH—$NH_2$). The variable x in the formula -($Q^1$-$NR^6$)$_x$-$Q^2$- is usually an integer in a range of 1 to 4, 1 to 3, or 1 to 2.

Any known method can be used to introduce the sulfonyl-containing group into the precursor polymeric material. That is, the precursor can be reacted with any known sulfonyl-containing compound. The formation of the specific —$SO_2R^5$ group often includes reacting the precursor polymeric material with a sulfonyl-containing compound such as a halogenated sulfonic acid and then further reacting the intermediate polymeric material with another compound such as ammonia, ammonium hydroxide, a polylamine, or hydrazine. The term "polyamine" refers to a compound of formula $NHR^6$-Q-$NR^6R^7$ where $R^6$ is hydrogen or alkyl and $R^7$ is hydrogen or —C(=NH)—$NH_2$.

In some embodiments, the precursor polymeric material is reacted in a two step process to form groups of formula —$SO_2R^5$. In the first step, the precursor polymeric material is reacted with a halogenated sulfonic acid (e.g., chlorosulfonic acid) as the sulfonyl-containing compound. The precursor polymeric material is mixed with a solution of the halogenated sulfonic acid dissolved in an appropriate organic solvent. Suitable organic solvents include various halogenated solvents such as 1,2-dichloroethane, methylene chloride, and chloroform. The solution of the halogenated sulfonic acid is often added to the precursor polymeric material at a temperature below room temperature such as, for example, at about 0° C. The initial reaction can be quite exothermic so, if adequate care is not taken, the solvent can boil during the addition. After the reactants are combined, the temperature is often increased to any desired temperature such as room temperature up to the temperature associated with reflux conditions. The reaction time can range from a few minutes to 24 hours. The reaction time and the reaction temperature can be varied to prepare polymeric materials with different amounts of the sulfonyl-containing group. After this reaction, the polymeric material has attached —$SO_2X$ groups where X is halo such as chloro. This is an intermediate polymeric material that is further reacted. More specifically, in a second step, the —$SO_2X$ groups are further reacted to provide groups of formula —$SO_2R^5$ and the formation of the sorbent polymeric material.

Typically, it is desirable to introduce as many sulfonyl-containing groups as possible into the precursor polymeric material. An excess of the sulfonyl-containing compound is used. That is, the moles of sulfonyl-containing compound can be up to 10 times the number of moles of aromatic rings in the precursor polymeric material. If it is desirable to have fewer sulfonyl-containing groups, the moles of sulfonyl-containing compound can be lowered, the reaction time can be shortened, or the reaction temperature can be lowered. For example, in some embodiments, there is not a sulfonyl group on each aromatic ring and the molar ratio of sulfonyl-containing compound to aromatic rings is less than 1.

To prepare —$SO_2NH_2$ groups, a sulfonyl-containing intermediate polymeric material having —$SO_2X$ groups (prepared using a halogenated sulfonic acid as described above) can be treated with ammonia gas or ammonium hydroxide. To maximize conversion of the —$SO_2X$ groups to —$SO_2NH_2$ groups, the moles of ammonia or ammonium hydroxide are often as much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions.

To prepare —$SO_2NH$—$NH_2$ groups, a sulfonyl-containing intermediate polymeric material having —$SO_2X$ groups (prepared using a halogenated sulfonic acid as described above) can be treated with hydrazine. Either hydrazine monohydrate or anhydrous hydrazine can be dissolved in an organic solvent. To maximize conversion of the —$SO_2X$ groups to —$SO_2NH$—$NH_2$ groups, the moles of hydrazine are often as much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —$SO_2OH$ groups.

To prepare —$SO_2NR^6$-Q-$NR^6R^7$ groups where $R^7$ is hydrogen and Q is not a single bond (i.e., the group is of formula —$SO_2NR^6$-Q-$NR^6H$), a sulfonyl-containing intermediate polymeric material having —$SO_2X$ groups (prepared using a halogenated sulfonic acid as described above) can be treated with an amino-containing compound of formula $R^6HN$-Q-$NR^6R^7$ (i.e., the amino-containing compound is of formula $R^6HN$-Q-$NR^6H$) such as $R^6HN$-($Q^1$-$NR^6$)$_x$-$Q^2$-$NR^6R^7$ (i.e., more specifically, $R^6HN$-($Q^1$-$NR^6$)$_x$-$Q^2$-$NR^6H$). Suitable examples of these compounds include, but are not limited to, ethylene diamine, diethylenetriamine, triethylenetetramine, tetraethylenepentamine, N,N'-dimethylethylenediamine, and the like. To maximize conversion of the —$SO_2X$ groups to —$SO_2NR^6$-Q-$NR^6R^7$ (i.e., —$SO_2NR^6$-Q-$NR^6H$) groups, the moles of reactive amino-containing groups are often as much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —$SO_2OH$ groups.

To prepare —$SO_2NR^6$-Q-$NR^6R^7$ groups where $R^7$ is —C(=NH)—$NH_2$ and where Q is not a single bond (i.e., the group is of formula —$SO_2NR^6$-Q-$NR^6$—C(=NH)—$NH_2$), a sulfonyl-containing intermediate polymeric material having —$SO_2X$ groups (prepared using a halogenated sulfonic acid as described above) can be treated with an amino-containing compound of formula $R^6HN$-Q-$NR^6$—C(=NH)—$NH_2$ or a salt thereof. Suitable examples include, but are not limited to, agmatine or a salt thereof. Alternatively, the —$SO_2X$ groups can be first reacted with a compound of formula $R^6HN$-Q-$NHR^6$ to prepare groups of formula —$SO_2$—$NR^6$-Q-$NHR^6$. Suitable examples of compounds of formula $R^6HN$-Q-$NHR^6$ include, but are not limited to, ethylene diamine, diethylenetriamine, triethylenetetramine, tetraethylenepentamine, N,N'-dimethylethylenediamine and the like. The groups of formula —$SO_2$—$NR^6$-Q-$NHR^6$ can be further reacted with methyl carbamimidate (MeO—C(=NH)—$NH_2$) to form —$SO_2$—$NR^6$-Q-$NR^6$—C(=NH)—$NH_2$ groups.

The sorbent polymeric material typically contains at least 0.2 milliequivalents of —$SO_2R^5$ per gram. In some embodiments, the amount of —$SO_2R^5$ is in a range of 0.2 to 7 milliequivalents per gram, in a range of 0.2 to 6 milliequivalents per gram, in a range of 0.2 to 5 milliequivalents per gram, in a range of 0.2 to 4.5 milliequivalents per gram, in a range of 0.5 to 4 milliequivalents per gram, in a range of 1 to 4 milliequivalents per gram, in a range of 2 to 4 milliequivalents per gram, or in a range of 3 to 4 milliequivalents per gram of the sorbent polymeric material. Any suitable method can be used to determine the milliequivalents per gram. In one preferred method, the total sulfur content of the sorbent polymeric material is determined by elemental analysis.

The —$SO_2R^5$ groups on the sorbent polymeric material can react with formaldehyde resulting in the capture of formaldehyde. This capture can occur with the sorbent polymeric material in a dry state and with formaldehyde present in air that is in contact with the sorbent polymeric material. The capture can occur at ambient temperatures.

In some embodiments, the sorbent polymeric material has —$SO_2NH_2$ groups. When the sorbent polymeric material is exposed to formaldehyde, at least some of the —$SO_2NH_2$ groups can be converted to a —$SO_2$—N=$CH_2$ group, a —$SO_2$—NH—$CH_2OH$ group, or a —$SO_2$—N($CH_2OH)_2$ group.

In other embodiments, the sorbent polymeric material has —$SO_2NH$—$NH_2$ groups. When the sorbent polymeric material is exposed to formaldehyde, at least some of the —$SO_2NH$—$NH_2$ groups are converted to a —$SO_2$—NH—N=$CH_2$ group, —$SO_2$—NH—NH—$CH_2OH$ group, or —$SO_2$—NH—N($CH_2OH)_2$ group.

In still other embodiments, the sorbent polymeric material has —$SO_2$—$NR^6$-Q-$NR^6R^7$ groups where $R^7$ is hydrogen and where Q is not a single bond (i.e., the sorbent has groups of formula —$SO_2$—$NR^6$-Q-$NR^6H$). When the sorbent polymeric material is exposed to formaldehyde, at least one of the —$SO_2$—$NR^6$-Q-$NR^6R^7$ groups (i.e., —$SO_2$—$NR^6$-Q-$NR^6H$ groups) are converted to a group of formula —$SO_2$—NR-Q-$NR^9R^{10}$ that is different from —$SO_2$—$NR^6$-Q-$NR^6R^7$. Each $R^8$ is hydrogen, alkyl (e.g., an alkyl group with 1 to 10 carbon atoms, 1 to 6 carbon atoms, or 1 to 4 carbon atoms), or —$CH_2OH$. Each $R^9$ is hydrogen, alkyl, —$CH_2OH$, or combines with a $R^{10}$ group attached to the same nitrogen atom to form =$CH_2$. Each $R^{10}$ is hydrogen, —$CH_2OH$, or combines with a $R^9$ group attached to the same nitrogen atom to form =$CH_2$. After exposure to formaldehyde, there is at least one —$CH_2OH$ group attached to a nitrogen atom, there is at least one =$CH_2$ group attached to a nitrogen atom, or both in the group of formula —$SO_2$—$NR^8$-Q-$NR^9R^{10}$.

In yet further embodiments, the sorbent polymeric material has —$SO_2$—$NR^6$-Q-$NR^6R^7$ groups where $R^7$ is —C(=NH)—$NH_2$. That is, the sorbent polymeric material has groups of formula —$SO_2$—$NR^6$-Q-$NR^6$—C(=NH)—$NH_2$. When the sorbent polymeric material is exposed to formaldehyde, at least some of the —$SO_2$—$NR^6$-Q-$NR^6$—C(=NH)—$NH_2$ groups are converted to a group of formula —$SO_2$—NR-Q-NR—C(=NR)—$N(R^{11})_2$ that is different from —$SO_2$—$NR^6$-Q-$NR^6$—C(=NH)—$NH_2$. Each $R^8$ is independently hydrogen, alkyl (e.g., an alkyl group with 1 to 10 carbon atoms, 1 to 6 carbon atoms, or 1 to 4 carbon atoms), or —$CH_2OH$. Each $R^{11}$ is independently hydrogen, —$CH_2OH$, or two $R^{11}$ groups attached to the same nitrogen atom combine to form =$CH_2$. After exposure to formaldehyde, there is at least one —$CH_2OH$ group attached to a nitrogen atom, there is at least one =$CH_2$ group attached to a nitrogen atom, or both in the group of formula —$SO_2$—$NR^8$-Q-NR—C(=NR)—$N(R^{11})_2$.

In another aspect, a polymeric material is provided that includes a reaction product of a mixture containing (a) a sorbent polymeric material having multiple aromatic rings and having at least one group of formula —$SO_2R^5$ and up to one group of formula —$SO_2R^5$ for each aromatic ring in the sorbent polymeric material and (b) formaldehyde. The sorbent polymeric material is the same as described above. Each $R^5$ is independently —$NH_2$ or —$NR^6$-Q-$NR^6R^7$. Each $R^6$ is hydrogen or an alkyl. Each $R^7$ is hydrogen or —C(=NH)—$NH_2$. Each Q is a single bond, alkylene, or a group of formula -($Q^1$-$NR^6)_x$-$Q^2$- where each $Q^1$ is an alkylene, each $Q^2$ is an alkylene, and x is in an integer in a range of 1 to 4.

If the sorbent polymeric material has one or more —$SO_2NH_2$ groups ($R^5$ is —$NH_2$), the polymeric material that is a reaction product of the sorbent polymeric material and formaldehyde has at least one —$SO_2$—N=$CH_2$ group, —$SO_2$—NH—$CH_2OH$ group, or —$SO_2$—N($CH_2OH)_2$ group.

If the sorbent polymeric material has one or more —$SO_2NH$—$NH_2$ groups ($R^5$ is of formula —$NR^6$-Q-$NR^6R^7$ where $R^6$ is hydrogen, $R^7$ is hydrogen, and Q is a single bond), the polymeric material that is a reaction product of the sorbent polymeric material and formaldehyde has at least one —$SO_2$—NH—N=$CH_2$ group, —$SO_2$—NH—NH—$CH_2OH$ group, or —$SO_2$—NH—N($CH_2OH)_2$ group.

If the sorbent polymeric material has one or more —$SO_2$—$NR^6$-Q-$NR^6R^7$ groups ($R^5$ is of formula —$NR^6$-Q-$NR^6R^7$) where $R^7$ is hydrogen and $R^6$ is hydrogen or alkyl (the sorbent has one or more groups of formula —$SO_2NR^6$-Q-$NR^6R^7$ (i.e., —$SO_2NR^6$-Q-$NR^6H$)), the polymeric material that is a reaction product of the sorbent polymeric material and formaldehyde has at least one group of formula —$SO_2$—NR-Q-$NR^9R^{10}$ that is different from —$SO_2$—$NR^6$-Q-$NR^6R^7$ (i.e., —$SO_2NR^6$—$NR^6H$). Each $R^8$ is hydrogen, alkyl (e.g., an alkyl group with 1 to 10 carbon atoms, 1 to 6 carbon atoms, or 1 to 4 carbon atoms), or —$CH_2OH$. Each $R^9$ is hydrogen, alkyl, —$CH_2OH$, or combines with a $R^{10}$ group attached to the same nitrogen atom to form =$CH_2$. Each $R^{10}$ is hydrogen, —$CH_2OH$, or combines with a $R^9$ group attached to the same nitrogen atom to form =$CH_2$. After exposure to formaldehyde, there is at least one —$CH_2OH$ group attached to a nitrogen atom, there is at least one =$CH_2$ group attached to a nitrogen atom, or both in the group of formula —$SO_2$—$NR^8$-Q-$NR^9R^{10}$. The group Q is typically not a single bond.

If the sorbent polymeric material has one or more —$SO_2$—$NR^6$-Q-$NR^6R^7$ groups ($R^5$ is —$NR^6$-Q-$NR^6R^7$) where $R^7$ is —C(=NH)—$NH_2$ and $R^6$ is hydrogen or alkyl (i.e., the sorbent has one or more groups of formula —$SO_2NR^6$-Q-$NR^6R^7$ that is of formula —$SO_2$—$NR^6$-Q-$NR^6$—C(=NH)—$NH_2$), the polymeric material that is a reaction product of the sorbent polymeric material and formaldehyde has at least one group of formula —$SO_2$—NR-Q-NR—C(=NR)—$N(R^{11})_2$ that is different from —$SO_2NR^6$-Q-$NR^6R^7$ (i.e., —$SO_2$—$NR^6$-Q-$NR^6$—C(=NH)—$NH_2$). Each $R^8$ is independently hydrogen, alkyl (e.g., an alkyl group with 1 to 10 carbon atoms, 1 to 6 carbon atoms, or 1 to 4 carbon atoms), or —$CH_2OH$. Each $R^{11}$ is hydrogen, —$CH_2OH$, or two $R^{11}$ groups attached to the same nitrogen atom combine to form =$CH_2$. After exposure to formaldehyde, there is at least one —$CH_2OH$ group attached to a nitrogen atom, there is at least one =$CH_2$ group attached to a nitrogen atom, or both in the group of formula —SO$_2$—NR-Q-NR—C(=NR)—N(R$^{11}$)$_2$. The group Q is typically not a single bond.

In addition to reacting with the groups of formula —SO$_2$R$^5$, formaldehyde may be captured by the sorbent polymeric material in other manners. For example, formaldehyde may be physically captured in the pores of the porous sorbent polymeric material or formaldehyde may undergo hydrogen bonding with the —SO$_2$R$^5$ groups that are present within the sorbent polymeric material.

Various embodiments are provided for methods of capturing formaldehyde on a sorbent polymeric material or for a polymeric material resulting from the capture of formaldehyde on a sorbent polymeric material.

Embodiment 1 is a method of capturing formaldehyde. The method includes (a) providing a sorbent polymeric material having multiple aromatic rings and having at least one group of formula —SO$_2$R$^5$ and up to one group of formula —SO$_2$R$^5$ for each aromatic ring in the sorbent polymeric material and (b) sorbing formaldehyde on the sorbent polymeric material. Providing the sorbent polymeric material includes forming a precursor polymeric material and then reacting the precursor polymeric material with a sulfonyl-containing compound. The precursor polymeric material includes a polymerized product of a polymerizable composition containing a monomer of Formula (I)

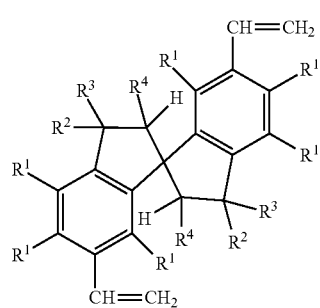

(I)

In Formula (I), each R$^1$ is hydrogen, halo, alkyl, aryl, alkaryl, or aralkyl, wherein at least one R$^1$ is hydrogen. Each R$^2$ is independently hydrogen, alkyl, aryl, alkaryl, aralkyl, combines with a R$^3$ connected to a same carbon atom to form a cyclic alkyl, or combines with a R$^3$ connected to the same carbon atom to form a cyclic alkyl that is fused to one or more carbocyclic rings. Each R$^3$ is independently hydrogen, alkyl, aryl, alkaryl, aralkyl, combines with a R$^2$ connected to a same carbon atom to form a cyclic alkyl, combines with a R$^2$ connected to the same carbon atom to form a cyclic alkyl that is fused to one or more carbocyclic rings, or combines with R$^4$ connected to an adjacent carbon atom to form a carbon-carbon bond. Each R$^4$ is independently hydrogen or combines with R$^3$ connected to the adjacent carbon atom to form a carbon-carbon bond. Each R$^5$ is independently —NH$_2$ or —NR$^6$-Q-NR$^6$R$^7$. Each R$^6$ is hydrogen or an alkyl. Each R$^7$ is hydrogen or —C(=NH)—NH$_2$. Each Q is a single bond, alkylene, or a group of formula -(Q$^1$-NR$^6$)$_x$-Q$^2$- where each Q$^1$ is an alkylene, each Q$^2$ is an alkylene, and x is in an integer in a range of 1 to 4.

Embodiment 2 is the method of embodiment 1, wherein the group of formula —SO$_2$R$^5$ is a —SO$_2$NH$_2$ group and wherein sorbing formaldehyde on the sorbent polymeric material converts the at least one —SO$_2$NH$_2$ group to a —SO$_2$—N=CH$_2$ group, —SO$_2$—NH—CH$_2$OH group, or —SO$_2$—N(CH$_2$OH)$_2$ group.

Embodiment 3 is the method of embodiment 1, wherein the group of formula —SO$_2$R$^5$ is a —SO$_2$NH—NH$_2$ group and wherein sorbing formaldehyde on the sorbent polymeric material converts the at least one —SO$_2$NH—NH$_2$ group to a group of formula —SO$_2$—NH—N=CH$_2$, —SO$_2$—NH—NH—CH$_2$OH, or —SO$_2$—NH—N(CH$_2$OH)$_2$.

Embodiment 4 is the method of embodiment 1, wherein the group of formula —SO$_2$R$^5$ is of formula —SO$_2$—NR$^6$-Q-NR$^6$R$^7$ where R$^7$ is hydrogen and R$^6$ is hydrogen or alkyl (i.e., the sorbent polymeric material has groups of formula —SO$_2$NR$^6$-Q-NR$^6$H) and wherein sorbing formaldehyde on the sorbent polymeric material converts the at least one group of formula —SO$_2$—NR$^6$-Q-NR$^6$R$^7$ (i.e., —SO$_2$NR$^6$—NR$^6$H) to a group of formula —SO$_2$—NR-Q-NR$^9$R$^{10}$ that is different than the group of formula —SO$_2$—NR$^6$-Q-NR$^6$R$^7$ (i.e., —SO$_2$NR$^6$—NR$^6$H). Each R$^8$ is hydrogen, alkyl (e.g., an alkyl group with 1 to 10 carbon atoms, 1 to 6 carbon atoms, or 1 to 4 carbon atoms), or —CH$_2$OH. Each R$^9$ is hydrogen, alkyl, —CH$_2$OH, or combines with a R$^{10}$ group attached to the same nitrogen atom to form =CH$_2$. Each R$^{10}$ is hydrogen, —CH$_2$OH, or combines with a R$^9$ group attached to the same nitrogen atom to form =CH$_2$. After exposure to formaldehyde, there is at least one —CH$_2$OH group attached to a nitrogen atom, there is at least one =CH$_2$ group attached to a nitrogen atom, or both in the group of formula —SO$_2$—NR-Q-NR$^9$R$^{10}$. Group Q is typically not a single bond.

Embodiment 5 is the method of embodiment 1, wherein the group of formula —SO$_2$R$^5$ is of formula —SO$_2$—NR$^6$-Q-NR$^6$R$^7$ where R$^7$ is —C(=NH)—NH$_2$ and R$^6$ is hydrogen or alkyl (i.e., the sorbent polymeric material has groups of formula —SO$_2$—NR$^6$-Q-NR$^6$—C(=NH)—NH$_2$) and wherein sorbing formaldehyde on the sorbent polymeric material converts the at least one group of formula —SO$_2$—NR$^6$-Q-NR$^6$R$^7$ (i.e., —SO$_2$—NR$^6$-Q-NR$^6$—C(=NH)—NH$_2$) to a group of formula —SO$_2$—NR$^8$-Q-NR—C(=NR)—N(R$^{11}$)$_2$ that is different from —SO$_2$—NR$^6$-Q-NR$^6$R$^7$ (i.e., —SO$_2$—NR$^6$-Q-NR$^6$—C(=NH)—NH$_2$). Each R$^8$ is independently hydrogen, alkyl (e.g., an alkyl group with 1 to 10 carbon atoms, 1 to 6 carbon atoms, or 1 to 4 carbon atoms), or —CH$_2$OH. Each R$^{11}$ is hydrogen, —CH$_2$OH or two R$^{11}$ groups attached to the same nitrogen atom combine to form =CH$_2$. After exposure to formaldehyde, there is at least one —CH$_2$OH group attached to a nitrogen atom or there is at least one =CH$_2$ group attached to a nitrogen atom in the group of formula —SO$_2$—NR-Q-NR—C(=NR)—N(R$^1$)$_2$. Group Q is typically not a single bond.

Embodiment 6 is the method of any one of embodiments 1 to 5, wherein the compound of Formula (I) is 3,3,3',3'-tetramethyl-1,1'-spirobisindan-6,6'-divinyl.

Embodiment 7 is the method of any one of embodiments 1 to 6, wherein the polymerizable composition further comprises a polyvinyl aromatic monomer or a polyvinyl aromatic monomer substituted with one or more alkyl groups.

Embodiment 8 is the method of embodiment 7, wherein the polyvinyl aromatic monomer is divinylbenzene, trivinylbenzene, divinylbenzene substituted with one or more alkyl groups, or trivinylbezene substituted with one or more alkyl groups.

Embodiment 9 is the method of any one of embodiments 1 to 8, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 10 is the method of any one of embodiments 1 to 9, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 11 is the method of any one of embodiments 1 to 10, wherein each $R^1$ is hydrogen or halo.

Embodiment 12 is the method of any one of embodiments 1 to 11, wherein each $R^2$ and each $R^3$ is alkyl.

Embodiment 13 is the method of any one of embodiments 1 to 12, wherein $R^4$ is hydrogen.

Embodiment 14 is the method of any one of embodiments 1 to 13, wherein the sorbent polymeric material is porous.

Embodiment 15 is the method of embodiment 14, wherein the sorbent polymeric material is microporous, mesoporous, or both.

Embodiment 16 is the method of any one of embodiments 1 to 15, wherein the sorbent polymeric material has the BET surface area equal to at least 100 $m^2$/gram.

Embodiment 17 is the method of any one of embodiments 1 to 16, wherein the sorbent polymeric material is in a form of beads or particles.

Embodiment 18 is a polymeric material comprising a reaction product of a mixture comprising a) a sorbent material having multiple aromatic rings and having at least one group of formula —$SO_2R^5$ and up to one group of formula —$SO_2R^5$ for each aromatic ring in the sorbent polymeric material and b) formaldehyde. The sorbent polymeric material comprises a reaction product of a precursor polymeric material and a sulfonyl-containing compound. The precursor polymeric material includes a polymerized product of a polymerizable composition comprising a monomer of Formula (I).

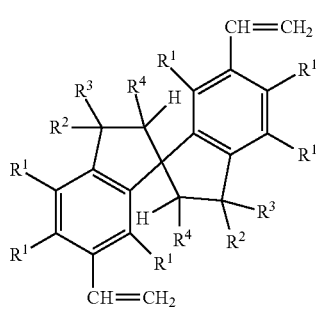

In Formula (I), each $R^1$ is hydrogen, halo, alkyl, aryl, alkaryl, or aralkyl, wherein at least one R is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. Each $R^5$ is independently —$NH_2$ or —$NR^6$-Q-$NR^6R^7$. Each $R^6$ is hydrogen or an alkyl. Each $R^7$ is hydrogen or —C(=NH)—$NH_2$. Each Q is a single bond, alkylene, or a group of formula -($Q^1$-$NR^6$)$_x$-$Q^2$- where each $Q^1$ is an alkylene, each $Q^2$ is an alkylene, and x is in an integer in a range of 1 to 4.

Embodiment 19 is the polymeric material of embodiment 18, wherein the group of formula —$SO_2R^5$ is a —$SO_2NH_2$ group and wherein sorbing formaldehyde on the sorbent polymeric material converts the at least one —$SO_2NH_2$ group to a —$SO_2$—N=$CH_2$ group, —$SO_2$—NH—$CH_2OH$ group, or —$SO_2$—N($CH_2OH$)$_2$ group.

Embodiment 20 is the polymeric material of embodiment 18, wherein the group of formula —$SO_2R^5$ is a —$SO_2NH$—$NH_2$ group and wherein sorbing formaldehyde on the sorbent polymeric material converts the at least one —$SO_2NH$—$NH_2$ group to a group of formula —$SO_2$—NH—N=$CH_2$, —$SO_2$—NH—NH—$CH_2OH$, or —$SO_2$—NH—N($CH_2OH$)$_2$.

Embodiment 21 is the polymeric material of embodiment 18, wherein the group of formula —$SO_2R^5$ is of formula —$SO_2$—$NR^6$-Q-$NR^6R^7$ where $R^7$ is hydrogen and $R^6$ is hydrogen or alkyl (i.e., the sorbent polymeric material has groups of formula —$SO_2NR^6$-Q-$NR^6H$) and wherein sorbing formaldehyde on the sorbent polymeric material converts the at least one group of formula —$SO_2$—$NR^6$-Q-$NR^6R^7$ (i.e., —$SO_2NR^6$—$NR^6H$) to a group of formula —$SO_2$—NR-Q-$NR^9R^{10}$ that is different than —$SO_2$—$NR^6$-Q-$NR^6R^7$. Each $R^8$ is hydrogen, alkyl (e.g., an alkyl group with 1 to 10 carbon atoms, 1 to 6 carbon atoms, or 1 to 4 carbon atoms), or —$CH_2OH$. Each $R^9$ is hydrogen, alkyl, —$CH_2OH$, or combines with a $R^{10}$ group attached to the same nitrogen atom to form =$CH_2$. Each $R^{10}$ is hydrogen, —$CH_2OH$, or combines with a $R^9$ group attached to the same nitrogen atom to form =$CH_2$. After exposure to formaldehyde, there is at least one —$CH_2OH$ group attached to a nitrogen atom, there is at least one =$CH_2$ group attached to a nitrogen atom, or both in the group of formula —$SO_2$—$NR^8$-Q-$NR^9R^{10}$. Group Q is typically not a single bond.

Embodiment 22 is the polymeric material of embodiment 18, wherein the group of formula —$SO_2R^5$ is of formula —$SO_2$—$NR^6$-Q-$NR^6R^7$ where $R^7$ is —C(=NH)—$NH_2$ and $R^6$ is hydrogen or alkyl (i.e., the sorbent polymeric material has groups of formula —$SO_2$—$NR^6$-Q-$NR^6$—C(=NH)—$NH_2$) and wherein sorbing formaldehyde on the sorbent polymeric material converts the at least one group of formula —$SO_2$—$NR^6$-Q-$NR^6$—C(=NH)—$NH_2$ to a group of formula —$SO_2$—$NR^8$-Q-NR—C(=NR)—N($R^{11}$)$_2$ that is different from —$SO_2$—$NR^6$-Q-$NR^6$—C(=NH)—$NH_2$. Each $R^8$ is independently hydrogen, alkyl (e.g., an alkyl group with 1 to 10 carbon atoms, 1 to 6 carbon atoms, or 1 to 4 carbon atoms), or —$CH_2OH$. Each $R^{11}$ is independently hydrogen, —$CH_2OH$ or two $R^{11}$ groups attached to the same nitrogen atom combine to form =$CH_2$. After exposure to formaldehyde, there is at least one —$CH_2OH$ group attached to a nitrogen atom, there is at least one =$CH_2$ group attached to a nitrogen atom, or both in the group of formula —$SO_2$—NR-Q-NR—C(=NR)—N($R^{11}$)$_2$. Group Q is typically not a single bond.

Embodiment 23 is the polymeric material of any one of embodiments 18 to 22, wherein the compound of Formula (I) is 3,3,3',3'-tetramethyl-1,1'-spirobisindan-6,6'-divinyl.

Embodiment 24 is the polymeric material of any one of embodiments 18 to 23, wherein the polymerizable composition further comprises a polyvinyl aromatic monomer or a polyvinyl aromatic monomer substituted with one or more alkyl groups.

Embodiment 25 is the polymeric material of embodiment 24, wherein the polyvinyl aromatic monomer is divinylbenzene, trivinylbenzene, divinylbenzene substituted with one or more alkyl groups, or trivinylbezene substituted with one or more alkyl groups.

Embodiment 26 is the polymeric material of any one of embodiments 18 to 25, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 27 is the polymeric material of any one of embodiments 18 to 26, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 28 is the polymeric material of any one of embodiments 18 to 27, wherein each $R^1$ is hydrogen or halo.

Embodiment 29 is the polymeric material of any one of embodiments 18 to 28, wherein each $R^2$ and each $R^3$ are alkyl.

Embodiment 30 is the polymeric material of any one of embodiments 18 to 29, wherein $R^4$ is hydrogen.

Embodiment 31 is the polymeric material of any one of embodiments 18 to 30, wherein the sorbent polymeric material is porous.

Embodiment 32 is the polymeric material of any one of embodiments 18 to 31, wherein the sorbent polymeric material is microporous, mesoporous, or both.

Embodiment 33 is the polymeric material of any one of embodiments 18 to 32, wherein the sorbent polymeric material has the BET surface area equal to at least 100 $m^2$/gram.

Embodiment 34 is the polymeric material of any one of embodiments 18 to 33, wherein the sorbent polymeric material is in a form of beads or particles.

EXAMPLES

TABLE 1

Glossary of materials

| Chemical Name | Chemical Supplier |
|---|---|
| 4,4'-Isopropylidene diphenol | Alfa Aesar, Ward Hill, MA |
| Methane sulfonic acid | Alfa Aesar, Ward Hill, MA |
| Methylene Chloride | EMD Millipore Chemicals, Billerica, MA |
| Methanol | BDH Merck Ltd., Poole Dorset, UK |
| Pyridine | EM Science, Gibbstown, NJ |
| Trifluoromethane sulfonic acid | Oakwood Products, West Columbia, SC |
| Concentrated hydrogen chloride | EMD Millipore Chemicals, Billerica, MA |
| Sodium bicarbonate | J. T. Baker, Phillipsburg, NJ |
| Sodium sulfate | BDH Merck Ltd., Poole Dorset, UK |
| N,N-dimethyl formamide | Sigma-Aldrich, Milwaukee, WI |
| Tributyl(vinyl)tin | Sigma-Aldrich, Milwaukee, WI |
| Lithium chloride | Mallinckrodt, St. Louis, MO |
| Bis(triphenylphosphine)palladium (II) chloride | Sigma-Aldrich, Milwaukee, WI |
| Diethyl ether | EMD Millipore Chemicals, Billerica, MA |
| Potassium fluoride | J. T. Baker, Phillipsburg, NJ |

TABLE 1-continued

Glossary of materials

| Chemical Name | Chemical Supplier |
|---|---|
| Ethyl acetate | EMD Millipore Chemicals, Billerica, MA |
| Petroleum ether | EMD Millipore Chemicals, Billerica, MA |
| Benzoyl peroxide | Sigma-Aldrich, Milwaukee, WI |
| Azoisobutyronitrile | Sigma-Aldrich, Milwaukee, WI |
| Dimethyl 2,2'-azobis(2-methylpropionate) | Wako Pure Chemical Industries, Ltd., Osaka, Japan |
| Methyl ethyl ketone | J. T. Baker, Phillipsburg, NJ |
| Divinylbenzene (80% tech grade) | Sigma-Aldrich, Milwaukee, WI |
| Acetone-D6 | Cambridge Isotope Laboratories, Inc., Andover, MA |
| Chloroform-D | Cambridge Isotope Laboratories, Inc., Andover, MA |
| Chlorosulfonic acid | Alfa Aesar, Ward Hill, MA |
| 1,2-dichloroethane | EMD Millipore Chemicals, Billerica, MA |
| Concentrated ammonium hydroxide | EMD Millipore Chemicals, Billerica, MA |
| Hydrazine monohydrate | Alfa Aesar, Ward Hill, MA |
| Tetrahydrofuran | EMD Millipore Chemicals, Billerica, MA |

Formaldehyde Capacity Test

A simple flow-through custom built delivery system was used to deliver known concentrations of formaldehyde to the sample for measurement. Plastic tubing was used throughout the delivery system, with the portions downstream of the formaldehyde generation being fluoropolymer tubing. Formaldehyde was generated by delivering a 6.33 wt. % solution of paraformaldehyde in water using a 2.5 mL Hamilton Gas-Tight Syringe. This syringe was driven at a specific rate by a KD Scientific Syringe Pump. By knowing the paraformaldehyde concentration in solution, and the cross-sectional area of the syringe, a precise rate of paraformaldehyde solution could be delivered. This solution was delivered onto a piece of hot gold foil in a flask which served to decompose the paraformaldehyde and vaporize the resulting formaldehyde. Through this flask, 250 mL/minute of nitrogen gas was passed, controlled by an Aalborg analog Mass Flow Controller. This controller was calibrated by placing a Gilibrator soap bubble flow meter at the output of the controller. The Gilibrator flow meter was used to measure a range of flows from each flow controller, which was used to generate calibration curves. The evaporation of the formaldehyde served to create a 250 ppm concentration of formaldehyde in the nitrogen. Water was also evaporated into the nitrogen, which humidified the stream to approximately 50% relative humidity. It is possible by this setup to generate higher and lower formaldehyde concentrations, and higher or lower relative humidity values by altering the concentration of the paraformaldehyde solution, the rate of solution delivery, and the nitrogen flow.

A sample to be tested for formaldehyde removal capability was added to a tared test tube (1.0 cm inner diameter) until the bed depth in the tube was 1.0 cm after being tamped. The mass of the sample was then determined by weighing the sample in the test tube. The test tube was then connected in line with the system, allowing the 250 ppm formaldehyde gas stream to flow through the sample. To the downstream side of the test tube, tubing was connected that led to a gas chromatograph (SRI 8610C) instrument. At the time the formaldehyde gas stream began to pass though the test sample, the test was considered started, and a timer was begun. Additionally, the gas chromatograph software recorded the timestamp of every data point taken. The SRI gas chromatograph then periodically sampled the gas stream and passed the sample through a Restek Rt-U-Bond 30 meter in length column.

The effluent from this column was then passed through a Methanizer followed by a Flame Ionization Detector (FID). The Methanizer served to convert the formaldehyde to methane; the methane was then ionized and detected by the FID. This signal was subsequently reported and recorded in the data acquisition software provided with the device. It was observed that good detection of formaldehyde vapor was found when the gas chromatograph sampled the gas stream for 6 seconds, allowed the sample to pass through the column for 144 seconds and then allowed 60 seconds to flush out the sample before it drew in the next sample to be analyzed.

The gas chromatograph was calibrated by delivering formaldehyde at different rates into the air stream. In this way, a signal to concentration curve could be made so that any level of signal on the gas chromatograph could be correlated to a concentration of formaldehyde.

To establish a full breakthrough curve, the test was run until the concentration exiting the material was nearly equal to the concentration entering it (250 ppm). Then, the plot of formaldehyde coming through versus time can be integrated to give the total amount of formaldehyde removed by the sample at any point in the breakthrough curve. By comparing this number to the initial mass of the sample, it was possible to calculate the formaldehyde removal capacity of the material per gram at 1 ppm breakthrough or full breakthrough.

Gas Sorption Analysis:

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified materials. In a Micromeritics half inch diameter sample tube, 50-300 milligrams of material was heated under ultra-high vacuum (3-7 micrometers Hg) for 3 hours on the analysis port of the ASAP 2020 to remove residual solvent and other adsorbates. Preparatory Examples 1 and 2 were heated at 150° C., and Examples 1-3 were heated at 80° C. Nitrogen sorption isotherms at 77 K were obtained of the material using low pressure dosing (5 cm$^3$/g) at p/p°<0.1 and a pressure table of linearly spaced pressure points from p/p°=0.1-0.98. The method made use of the following equilibrium intervals: 90 seconds at p/p°<10$^{-5}$, 40 seconds at p/p°=10$^{-5}$-0.1, and 20 seconds at p/p°>0.1. Helium was used for the free space determination, after nitrogen sorption analysis, both at ambient temperature and at 77 K.

BET specific surface areas (SA$_{BET}$) were calculated from nitrogen adsorption data by multipoint Brunauer-Emmett-Teller (BET) analysis. Apparent micropore distributions were calculated from nitrogen adsorption data by density functional theory (DFT) analysis using the standard nitrogen DFT model. Total pore volume was calculated from the total amount of nitrogen adsorbed at a relative pressure (p/p°) equal to approximately 0.95. Argon sorption isotherms at 77° K were obtained using low pressure dosing (5 cm$^3$/g) at a relative pressure (p/p°) less than 0.1 and a pressure table of linearly spaced pressure points from a p/p° in a range from 0.1 to 0.98. The method made use of the following equilibrium intervals: 90 seconds at p/p° less than 10$^{-5}$, 40 seconds at p/p° in a range of 10$^{-5}$ to 0.1, and 20 seconds at p/p° greater than 0.1. Helium was used for the free space determination, after argon sorption analysis, both at ambient temperature and at 77° K. SA$_{BET}$ were calculated from argon adsorption data by multipoint BET analysis. Apparent micropore distributions were calculated from argon adsorption data by DFT analysis using the argon at 77° K on carbon slit pores by non-linear density functional theory (NLDFT) model. Total pore volume was calculated from the total amount of argon adsorbed at a p/p° equal to approximately 0.95. BET, DFT and total pore volume analyses were performed using Micromeritics MicroActive Version 1.01 software.

Elemental Analysis:

Samples were analyzed for weight percent carbon, hydrogen, nitrogen and sulfur by combustion using a LECO TruSpec Micro CHNS elemental analyzer (LECO Corp, St. Joseph, Mich.). The samples were run in triplicate or better. Results are reported as the averages of replicate determinations. In order to eliminate ambient water from the analysis, aliquots of each sample were dried on a steam-plate under nitrogen for 2 hours and allowed to cool in a nitrogen purged dry-box for 30 minutes before weighing. The samples were placed in silver capsules and crimped and placed on the auto-sampler in ambient conditions.

The LECO TruSpec Micro CHNS instrument was calibrated by first base-lining the instrument with ambient air until the CHNS detectors are stabilized. Next, 3-4 empty crucibles were measured and set as instrument blanks. Finally, a calibration curve was generated with sulfamethazine as a standard. Based on this procedure the standard deviation for each element was: less than +/−0.5 weight percent for carbon, less than +/−0.3 weight percent for hydrogen, less than +/−0.3 weight percent for nitrogen and less than +/−0.3 weight percent for sulfur.

Synthesis of 3,3,3',3'-tetramethyl-1,1'-spirobisindan-6,6'-diol (SBI-diol)

In a 5.0 L round bottomed flask, 1000.69 g (4.38 moles) of 4,4'-isopropylidene diphenol (BPA) was melted. Once all of the BPA was melted, 50.51 g (0.526 moles) of methane sulfonic acid was slowly added. The reaction mixture was stirred for 3 hours under a nitrogen atmosphere maintaining the temperature of the reaction mixture between 135-150° C. After 3 hours, while still hot, the molten reaction mixture was poured into 2.0 L of deionized water. A brown precipitate formed. The resulting precipitate was isolated by vacuum filtration and washed with 1.5 L of deionized water. The isolated solid was then put back in the 5.0 L round bottomed flask and 1.5 L of methylene chloride ($CH_2Cl_2$) was added. The solid was stirred in the $CH_2Cl_2$ at reflux for one hour. The flask was then allowed to cool to room temperature, and the flask was placed in a refrigerator (~0° C.) overnight. The solid was then isolated by vacuum filtration and washed with a minimal amount (~500 mL) of chilled $CH_2Cl_2$. The solid was then placed in a 4.0 L Erlenmeyer flask and dissolved in 900 mL of methanol (MeOH). To this solution was added 190 mL of $CH_2Cl_2$. The solution remained clear. The solution was stirred and 1.1 L of deionized water was added in portions. A white precipitate formed, and the mixture was placed in a refrigerator (~0° C.) overnight. The solid was isolated by vacuum filtration and washed with a minimal amount (~300 mL) of chilled $CH_2Cl_2$. The MeOH/$CH_2Cl_2$/$H_2O$ precipitation was repeated once more. The solid from the second precipitation was dried in a vacuum oven at 85° C. overnight to yield 214.77 g (48%) of SBI-diol. $^1$H NMR (500 MHz, acetone-d$_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Synthesis of perfluoromethane-1-sulfonic acid 6'-(perfluoromethane-1-sulfonyloxy)-3,3,3',3'-tetramethyl-1,1'-spirobisindane-6-yl ester (SBI-bistriflate)

In a 250 mL round bottomed flask, 5.0025 g (16.2 mmol) of SBI-diol and 4.755 mL (47.1 mmol) of pyridine were dissolved in 150 mL of $CH_2Cl_2$. The flask was placed in an ice/water bath. To this solution was added dropwise 7.930 mL (58.8 mmol) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous HCl (10% by weight). The resulting mixture was partitioned between $CH_2Cl_2$ and a saturated aqueous solution of sodium bicarbonate ($NaHCO_3$). The organic layer was isolated, dried over anhydrous sodium sulfate ($Na_2SO_4$) and filtered. The filtrate was condensed under reduced pressure and dried under high vacuum at room temperature for 3 hours to remove any residual pyridine. The resulting tan solid (SBI-bistriflate) weighed 8.51 g (92%). $^1$H NMR (500 MHz, $CDCl_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}$F NMR (470.5 MHz, $CDCl_3$) δ −73.0.

Synthesis of 3,3,3',3'-tetramethyl-1'-spirobisindan-6,6'-divinyl (SBI-DV)

In a 250 mL round bottomed flask, 5.0025 g (8.74 mmol) of SBI-bistriflate was dissolved in 75 mL of anhydrous N,N-dimethyl formamide (DMF). To this solution was added 6.125 mL (21.0 mmol) of vinyl tributyltin and 22.2225 g (52.4 mmol) of lithium chloride (LiCl). The reaction mixture was stirred at room temperature under a nitrogen atmosphere for 5 minutes before adding 0.6140 g (875 μmol) of bis(triphenylphosphine)palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed. The aqueous layer and precipitate were extracted with diethyl ether ($Et_2O$) (3×200 mL). The organic layers were combined. The organic layer was then stirred vigorously at room temperature with an equal volume of aqueous potassium fluoride (KF) (10 g/100 mL) for 1 hour. A gray-white precipitate formed and the mixture was vacuum filtered. The filtrate was then placed back in a separatory funnel and the organic layer isolated. The organic layer was then dried over anhydrous $Na_2SO_4$, filtered and the filtrate was condensed under reduced pressure to yield a white solid. This solid was further purified by silica gel chromatography. The material was loaded onto a silica gel column (8×25 cm), and the column was eluted with 5% ethyl acetate (EtOAc)/95% petroleum ether (PE) (vol./vol.). Fractions containing the pure SBI-DV were combined, condensed under reduced pressure and dried under high vacuum at room temperature to yield 2.3822 g (83%) of SBI-DV as a white solid. $^1$H NMR (500 MHz, $CDCl_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Preparatory Example 1

A 0.9 milligrams/mL solution of AIBN was made by dissolving 17.3 milligrams of AIBN in 19.2 mL of EtOAc.

In a 20 mL vial, 0.3002 grams (914 μmoles) of SBI-DV was dissolved in 6.0 mL of EtOAc. To this solution was added 2.0 mL of the AIBN/EtOAc solution. The polymerization mixture thus consisted of an EtOAc solution of SBI-DV at 4.0 weight percent solids and 0.6 weight percent AIBN (based on amount of SBI-DV). The polymerization mixture was bubbled with nitrogen for 10 minutes. The vial was then capped and placed in a sand bath at 90° C. The polymerization was heated at this elevated temperature for 16 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 90° C. overnight. This material had a $SA_{BET}$ (surface area calculated using the BET method) of 853.8 m$^2$/gram and total pore volume of 0.582 cm$^3$/gram (p/p°=0.950) as determined by nitrogen sorption.

Preparatory Example 2

In a 40 mL vial, 0.3011 grams (917 μmoles) of SBI-DV and 395 μL (2.72 mmoles) of DVB (80%, tech grade) was dissolved in 17.6 mL of EtOAc. To this solution was added 13.0 milligrams of BPO. The polymerization mixture thus consisted of an EtOAc solution of SBI-DV/DVB in a 1:3 molar ratio at 3.6 weight percent solids and 2 weight percent BPO (based on amount of SBI-DV and DVB). The polymerization mixture was bubbled with nitrogen for 10 minutes. The vial was then capped and placed in a sand bath at 80° C. The polymerization was heated at this elevated temperature for 17 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 110° C. overnight. This material had a $SA_{BET}$ of 890.2 m$^2$/gram and total pore volume of 0.868 cm$^3$/gram (p/p°=0.951) as determined by nitrogen sorption. This material had a $SA_{BET}$ of 854.1 m$^2$/gram and total pore volume of 0.657 cm$^3$/gram (p/p°=0.951) as determined by argon sorption.

Example 1

A chlorosulfonic acid/1,2-dichloroethane (DCE) solution was prepared by adding 3.0 mL of chlorosulfonic acid to 15.8 mL of DCE which was cooled to 0° C. in an ice/water bath. This solution was added to a 20 mL vial containing 0.250 grams of the material produced in Preparatory Example 1 (SBI-DV homopolymer) with the vial submerged in an ice/water bath. After 5 minutes at 0° C., the capped vial was removed from the ice bath and placed in a sand bath at 90° C. After 18 hours at this elevated temperature, the reaction was stopped by isolating the solid polymeric material by vacuum filtration. The solid was washed twice with 20 mL of $CH_2Cl_2$.

The resulting solid was then placed in a 20 mL vial containing an aqueous ammonium hydroxide solution prepared by adding 2.0 mL of concentrated ammonium hydroxide to 6 mL of deionized water. The vial was capped and shaken, using a wrist shaker, overnight at room temperature. The reaction was stopped by isolating the solid polymeric material by vacuum filtration. The solid was washed with deionized water until the pH of the filtrate was approximately 8. The solid was then dried under high vacuum at 70° C. overnight. This material had a $SA_{BET}$ of 483.6 m²/gram and total pore volume of 0.221 cm³/gram (p/p°=0.954) as determined by argon sorption.

Example 2

A chlorosulfonic acid/DCE solution was prepared by adding 2.3 mL of chlorosulfonic acid to 12 mL of DCE which was cooled to 0° C. in an ice/water bath. This solution was added to a 20 mL vial containing 0.190 grams of the material produced in Preparatory Example 2 (SBI-DV/DVB 1:3 molar ratio copolymer) with the vial submerged in an ice/water bath. After 5 minutes at 0° C., the capped vial was removed from the ice bath and placed in a sand bath at 90° C. After 18 hours at this elevated temperature, the reaction was stopped by isolating the solid polymeric material by vacuum filtration. The solid was washed twice with 20 mL of $CH_2Cl_2$.

The resulting solid was then placed in a 20 mL vial containing an aqueous ammonium hydroxide solution prepared by adding 1.7 mL of concentrated ammonium hydroxide to 5 mL of deionized water. The vial was capped and shook, using a wrist shaker, overnight at room temperature. The reaction was stopped by isolating the solid polymeric material by vacuum filtration. The solid was washed with deionized water until the pH of the filtrate was about 8. The solid was then dried under high vacuum at 70° C. overnight.

The functional group equivalents of this material were determined by elemental analysis based on weight percent sulfur to be 3.56 mmoles/gram and based on weight percent nitrogen to be 3.56 mmoles/gram. This material had a $SA_{BET}$ of 462.0 m²/gram and total pore volume of 0.365 cm³/gram (p/p°=0.951) as determined by argon sorption. The formaldehyde capacity of this material was determined per the formaldehyde capacity test described above to be 1.46 mmol/gram at 1 ppm breakthrough.

Example 3

A chlorosulfonic acid/DCE solution was prepared by adding 2.3 mL of chlorosulfonic acid to 12 mL of DCE which was cooled to 0° C. in an ice/water bath. This solution was added to a 20 mL vial containing 0.210 grams of the material produced in Preparatory Example 2 (SBI-DV/DVB 1:3 molar ratio copolymer) with the vial submerged in an ice/water bath. After 5 minutes at 0° C., the capped vial was removed from the ice bath and placed in a sand bath at 90° C. After 18 hours at this elevated temperature, the reaction was stopped by isolating the solid polymeric material by vacuum filtration. The solid was washed twice with 20 mL of $CH_2Cl_2$.

The resulting solid was then placed in a 20 mL vial containing a hydrazine/tetrahydrofuran (THF) solution prepared by adding 1.2 mL of hydrazine monohydrate to 5 mL of THF. The vial was capped and shook, using a wrist shaker, overnight at room temperature. The reaction was stopped by isolating the solid polymeric material by vacuum filtration. The solid was washed with 50 mL of THF. The solid was then placed in a 20 mL vial with 10 mL of deionized water. The solid was allowed to stand in the water for 1 hour at room temperature. The solid was then isolated by vacuum filtration and washed with deionized water until the pH of the filtrate was about 8. The solid was then dried under high vacuum at 70° C. overnight.

The functional group equivalents of this material were determined by elemental analysis based on weight percent sulfur to be 3.32 mmoles/gram and based on weight percent nitrogen to be 2.53 mmoles/grams. This material had a $SA_{BET}$ of 323.0 m²/gram and total pore volume of 0.277 cm³/gram (p/p°=0.950) as determined by argon sorption.

I claim:

1. A method of capturing formaldehyde, the method comprising:
  a) providing a sorbent polymeric material having multiple aromatic rings and having at least one group of formula $-SO_2R^5$ and up to one group of formula $-SO_2R^5$ for each aromatic ring in the sorbent polymeric material, wherein providing the sorbent polymeric material comprises reacting a precursor polymeric material with a sulfonyl-containing compound, the precursor polymeric material comprising a polymerized product of a polymerizable composition comprising a monomer of Formula (I)

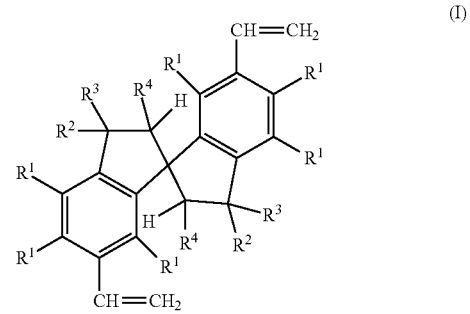

wherein
  each $R^1$ is hydrogen, halo, alkyl, aryl, alkaryl, or aralkyl, wherein at least one $R^1$ is hydrogen;
  each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
  each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
  each $R^4$ is independently hydrogen or combines with $R^3$ connected to the adjacent carbon atom to form a carbon-carbon bond; and
  each $R^5$ is independently $-NH_2$ or $-NR^6-Q-NR^6R^7$;
  each $R^6$ is independently hydrogen or an alkyl;
  each $R^7$ is hydrogen or $-C(=NH)-NH_2$;
  Q is a single bond, alkylene, or a group of formula $-(Q^1-NR^6)_x-Q^2-$;

each $Q^1$ is an alkylene;
each $Q^2$ is an alkylene; and
x is in an integer in a range of 1 to 4; and
b) sorbing formaldehyde on the sorbent polymeric material.

2. The method of claim 1, wherein the group of formula —$SO_2R^5$ is a —$SO_2NH_2$ group and wherein sorbing formaldehyde on the sorbent polymeric material converts the at least one $SO_2NH_2$ group to a $SO_2$—N=$CH_2$ group, —$SO_2$—NH—$CH_2OH$ group, or —$SO_2$—N($CH_2OH)_2$ group.

3. The method of claim 1, wherein the group of formula —$SO_2R^5$ is a —$SO_2NH$—$NH_2$ group and wherein sorbing formaldehyde on the sorbent polymeric material converts the at least one —$SO_2NH$—$NH_2$ group to a group of formula —$SO_2$—NH—N=$CH_2$, —$SO_2$—NH—NH—$CH_2OH$, or —$SO_2$—NH—N($CH_2OH)_2$.

4. The method of claim 1, wherein the group of formula —$SO_2R^5$ is of formula —$SO_2$—$NR^6$-Q-$NR^6R^7$ where $R^7$ is hydrogen and wherein sorbing formaldehyde on the sorbent polymeric material converts the at least one group of formula —$SO_2$—$NR^6$-Q-$NR^6R^7$ to a group of formula —$SO_2$—$NR^8$-Q-$NR^9R^{10}$ that is different from —$SO_2$—$NR^6$-Q-$NR^6R^7$,
wherein
each $R^8$ is hydrogen, alkyl, or —$CH_2OH$;
each $R^9$ is hydrogen, alkyl, —$CH_2OH$, or combines with a $R^{10}$ group attached to the same nitrogen atom to form =$CH_2$; and
each $R^{10}$ is hydrogen, —$CH_2OH$, or combines with a $R^9$ group attached to the same nitrogen atom to form =$CH_2$.

5. The method of claim 1, wherein the group of formula —$SO_2R^5$ is of formula —$SO_2$—$NR^6$-Q-$NR^6R^7$ where $R^7$ is —C(=NH)—$NH_2$ and wherein sorbing formaldehyde on the sorbent polymeric material converts the at least one group of formula —$SO_2$—$NR^6$-Q-$NR^6R^7$ to a group of formula —$SO_2$—$NR^8$-Q-$NR^8$—C(=$NR^8$)—N($R^{11})_2$ that is different from —$SO_2$—$NR^6$-Q-$NR_6R_7$,
wherein
each $R^8$ is independently hydrogen, alkyl, or —$CH_2OH$; and
each $R^{11}$ is independently hydrogen, —$CH_2OH$ or two $R^{11}$ groups attached to the same nitrogen atom combine to form =$CH_2$.

6. The method of claim 1, wherein the compound of Formula (I) is 3,3,3',3'-tetramethyl-1,1'-spirobisindan-6,6'-divinyl.

7. The method of claim 1, wherein the polymerizable composition further comprises a polyvinyl aromatic monomer or a polyvinyl aromatic monomer substituted with one or more alkyl groups.

8. The method of claim 1, wherein the polymerizable composition further comprises up to 25 weight percent of a mono-vinyl aromatic monomer or a mono-vinyl aromatic monomer substituted with one or more alkyl groups, wherein the weight percent is based on a total weight of monomers in the polymerizable composition.

9. The method of claim 1, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

10. The method of claim 1, wherein the sorbent polymeric material has the BET surface area equal to at least 100 $m^2$/gram and is porous.

11. A polymeric material comprising a reaction product of a mixture comprising:
a) a sorbent polymeric material having multiple aromatic rings and having at least one group of formula —$SO_2R^5$ and up to one group of formula —$SO_2R^5$ for each aromatic ring in the sorbent polymeric material, wherein the sorbent polymeric material comprises a reaction product of a precursor polymeric material and a sulfonyl-containing compound, the precursor polymeric material comprising a polymerized product of a polymerizable composition comprising a monomer of Formula (I)

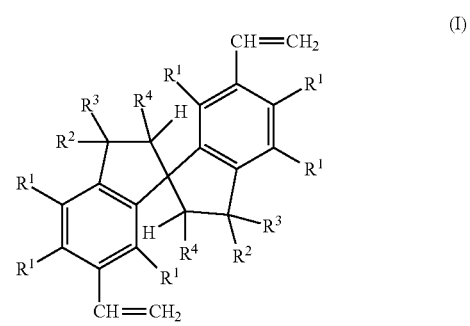

wherein
each $R^1$ is hydrogen, halo, alkyl, aryl, alkaryl, or aralkyl, wherein at least one $R^1$ is hydrogen;
each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
each $R^4$ is independently hydrogen or combines with $R^3$ connected to the adjacent carbon atom to form a carbon-carbon bond; and
each $R^5$ is independently —$NH_2$ or —$NR^6$-Q-$NR^6R^7$;
each $R^6$ is independently hydrogen or an alkyl;
each $R^7$ is hydrogen or —C(=NH)—$NH_2$;
Q is a single bond, alkylene, or a group of formula -($Q^1$-$NR^6)_x$-$Q^2$-;
each $Q^1$ is an alkylene;
each $Q^2$ is an alkylene; and
x is in an integer in a range of 1 to 4; and
b) formaldehyde.

12. The polymeric material of claim 11, wherein the group of formula —$SO_2R^5$ is a —$SO_2NH_2$ group and wherein sorbing formaldehyde on the sorbent polymeric material converts the at least one —$SO_2NH_2$ group to a —$SO_2$—N=$CH_2$ group, —$SO_2$—NH—$CH_2OH$ group, or —$SO_2$—N($CH_2OH)_2$ group.

13. The polymeric material of claim 11, wherein the group of formula —$SO_2R^5$ is a —$SO_2NH$—$NH_2$ group and wherein sorbing formaldehyde on the sorbent polymeric material converts the at least one —$SO_2NH$—$NH_2$ group to a group of formula —SO$_2$—NH—N=CH$_2$, —SO$_2$—NH—NH—CH$_2$OH, or —SO$_2$—NH—N(CH$_2$OH)$_2$.

14. The polymeric material of claim 11, wherein the group of formula —SO$_2$R$^5$ is of formula —SO$_2$—NR$^6$-Q-NR$^6$R$^7$ where R$^7$ is hydrogen and wherein sorbing formaldehyde on the sorbent polymeric material converts the at least one group of formula —SO$_2$—NR$^6$-Q-NR$^6$R$^7$ to a group of formula —SO$_2$—NR$^8$-Q-NR$^9$R$^{10}$ that is different from —SO$_2$—NR$^6$-Q-NR$^6$R$^7$, wherein each R$^8$ is hydrogen, alkyl, or —CH$_2$OH;

each R$^9$ is hydrogen, alkyl, —CH$_2$OH, or combines with a R$^{10}$ group attached to the same nitrogen atom to form =CH$_2$; and each R$^{10}$ is hydrogen, —CH$_2$OH, or combines with a R$^9$ group attached to the same nitrogen atom to form =CH$_2$.

15. The polymeric material of claim 11, wherein the group of formula —SO$_2$R$^5$ is of formula —SO$_2$—NR$^6$-Q-NR$^6$R$^7$ where R$^7$ is —C(=NH)—NH$_2$ and wherein sorbing formaldehyde on the sorbent polymeric material converts the at least one group of formula —SO$_2$—NR$^6$-Q-NR$^6$R$^7$ to a group of formula —SO$_2$—NR$^8$-Q-NR$^8$—C(=NR$^8$)—N(R$^{11}$)$_2$ that is different from —SO$_2$—NR$^6$-Q-NR$^6$R$^7$, wherein each R$^8$ is independently hydrogen, alkyl, or —CH$_2$OH; and each R$^{11}$ is independently hydrogen, —CH$_2$OH or two R$^H$ groups attached to the same nitrogen atom combine to form =CH$_2$.

16. The polymeric material of claim 11, wherein the compound of Formula (I) is 3,3,3',3'-tetramethyl-1,1'-spiro-bisindan-6,6'-divinyl.

17. The polymeric material of claim 11, wherein the polymerizable composition further comprises a polyvinyl aromatic monomer or a polyvinyl aromatic monomer substituted with one or more alkyl groups.

18. The polymeric material of claim 11, wherein the polymerizable composition further comprises up to 25 weight percent of a mono-vinyl aromatic monomer or a mono-vinyl aromatic monomer substituted with one or more alkyl groups, wherein the weight percent is based on a total weight of monomers in the polymerizable composition.

19. The polymeric material of claim 11, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

20. The polymeric material of claim 11, wherein the sorbent polymeric material has the BET surface area equal to at least 100 m$^2$/gram and is porous.

* * * * *

UNITED STATES PATENT AND TRADEMARK OFFICE
CERTIFICATE OF CORRECTION

PATENT NO. : 10,391,471 B2
APPLICATION NO. : 15/520163
DATED : August 27, 2019
INVENTOR(S) : Michael S. Wendland Page 1 of 2

It is certified that error appears in the above-identified patent and that said Letters Patent is hereby corrected as shown below:

On the Title Page

Item (57) Abstract, Line 15, after "is" delete "in".

In the Specification

Column 2
Line 20, Delete "phyisorption" and insert -- physisorption --, therefor.

Column 4
Line 50, Delete ""mircopores"" and insert -- "micropores" --, therefor.

Column 12
Line 47, Delete "(2-methylproprionate))," and insert -- (2-methylpropionate)), --, therefor.

Column 14
Line 59, Delete "—$SO_2NH_3$+)." and insert -- —$SO_2NH_3^{+1}$). --, therefor.

Column 15
Line 17, Delete "polylamine," and insert -- polyamine, --, therefor.

Column 17
Line 40, Delete "NR" and insert -- $NR^8$ --, therefor.
Line 59, Delete "NR-Q-NR—C(=NR)" and insert -- $NR^8$-Q-$NR^8$—C(=$NR^8$) --, therefor.

Column 18
Line 2, Delete "NR—C(=NR)" and insert -- $NR^8$—C(=$NR^8$) --, therefor.
Line 34, Delete "-$NR^6H$))," and insert -- -$NR^6H$), --, therefor.
Line 37, Delete "NR" and insert -- $NR^8$ --, therefor.
Line 58, Delete "NR-Q-NR—C(=NR)" and insert -- $NR^8$-Q-$NR^8$—C(=$NR^8$) --, therefor.

Signed and Sealed this
Twenty-second Day of October, 2019

Andrei Iancu
*Director of the United States Patent and Trademark Office*

Column 19
Line 1, Delete "NR-Q-NR—C(=NR)" and insert -- $NR^8$-Q-$NR^8$—C(=$NR^8$) --, therefor.

Column 20
Lines 15, 27 and 38, Delete "NR" and insert -- $NR^8$ --, therefor.
Line 39, Delete "(=NR)" and insert -- (=$NR^8$) --, therefor.
Line 48, Delete "NR" and insert -- $NR^8$ --, therefor.
Line 49, Delete "NR—C(=NR)—N($R^1$)$_2$." and insert -- $NR^8$—C(=$NR^8$)—N($R^{11}$)$_2$. --, therefor.
Line 62, Delete "trivinylbezene" and insert -- trivinylbenzene --, therefor.

Column 21
Line 56, Delete "R" and insert -- $R^1$ --, therefor.

Column 22
Line 30, Delete "NR" and insert -- $NR^8$ --, therefor.
Line 51, Delete "NR—C(=NR)" and insert -- $NR^8$—C(=$NR^8$) --, therefor.
Line 61, Delete "NR-Q-NR—C(=NR)" and insert -- $NR^8$-Q-$NR^8$—C(=$NR^8$) --, therefor.

Column 23
Line 7, Delete "trivinylbezene" and insert -- trivinylbenzene --, therefor.

In the Claims

Column 31
Line 3, In Claim 1, after "is" delete "in".
Line 9, In Claim 2, delete "$SO_2NH_2$" and insert -- —$SO_2NH_2$ --, therefor.
Line 9, In Claim 2, delete "$SO_2$" and insert -- —$SO_2$ --, therefor.
Line 39, In Claim 5, delete "$NR_6R_7$," and insert -- $NR^6R^7$, --, therefor.

Column 32
Line 56, In Claim 11, after "is" delete "in".

Column 34
Line 2, In Claim 15, delete "$R^{11}$" and insert -- $R^{11}$ --, therefor.